(12) United States Patent
Koo

(10) Patent No.: US 8,341,581 B2
(45) Date of Patent: Dec. 25, 2012

(54) ASICS HAVING PROGRAMMABLE BYPASS OF DESIGN FAULTS

(75) Inventor: James T. Koo, Hong Kong (CN)

(73) Assignee: Sheyu Group, LLC, Wilmington, DE (US)

( * ) Notice: Subject to any disclaimer, the term of this patent is extended or adjusted under 35 U.S.C. 154(b) by 1219 days.

(21) Appl. No.: 12/145,275

(22) Filed: Jun. 24, 2008

(65) Prior Publication Data

US 2008/0258762 A1    Oct. 23, 2008

Related U.S. Application Data

(63) Continuation of application No. 11/047,179, filed on Jan. 31, 2005, now Pat. No. 7,426,708.

(51) Int. Cl.
*G06F 17/50* (2006.01)

(52) U.S. Cl. .................................. 716/117; 716/138

(58) Field of Classification Search .................. 716/117, 716/138

See application file for complete search history.

(56) References Cited

U.S. PATENT DOCUMENTS

| | | |
|---|---|---|
| 5,655,069 A | 8/1997 | Ogawara et al. |
| 5,852,561 A | 12/1998 | Chan et al. |
| 6,178,541 B1 | 1/2001 | Joly et al. |
| 6,334,207 B1 | 12/2001 | Joly et al. |
| 6,539,052 B1 | 3/2003 | Hessel et al. |
| 6,608,589 B1 | 8/2003 | Devereux et al. |
| 6,618,839 B1 | 9/2003 | Beardslee et al. |
| 6,744,274 B1 | 6/2004 | Arnold et al. |
| 6,766,406 B1 | 7/2004 | Gasperini et al. |
| 6,769,107 B1 | 7/2004 | Watkins |
| 6,937,493 B2 | 8/2005 | Krause et al. |
| 6,991,947 B1 * | 1/2006 | Gheewala ................. 438/15 |
| 7,024,641 B1 | 4/2006 | Watkins |
| 7,042,899 B1 | 5/2006 | Vaida et al. |
| 2002/0066956 A1 | 6/2002 | Taguchi |
| 2002/0166058 A1 * | 11/2002 | Fueki ..................... 713/194 |
| 2002/0173298 A1 | 11/2002 | Elayda et al. |
| 2003/0014743 A1 | 1/2003 | Cooke et al. |
| 2003/0052176 A1 | 3/2003 | Nozawa et al. |
| 2003/0099358 A1 | 5/2003 | Michael et al. |
| 2004/0034843 A1 | 2/2004 | Osann |
| 2004/0183564 A1 | 9/2004 | Schadt et al. |
| 2006/0101288 A1 | 5/2006 | Smeets et al. |
| 2006/0117274 A1 | 6/2006 | Tseng et al. |
| 2006/0179435 A1 | 8/2006 | Hirase |
| 2006/0225002 A1 | 10/2006 | Hassoun et al. |
| 2006/0248493 A1 | 11/2006 | Osann |

OTHER PUBLICATIONS

International Search Report, PCT/US06/02858, May 29 2008, 4 pages.
Written Opinion of the International Searching Authority, PCT/US06/02858, May 29, 2008, 6 pages.
Zuchowski, Paul S.; A Hybrid ASIC and FPGA Architecture; 2002; IEEE; pp. 187-194.

* cited by examiner

*Primary Examiner* — Suresh Memula

(57) ABSTRACT

A relatively small amount of programmable or reprogrammable logic (pro-Logic) is included in a mostly-ASIC device so that such re/programmable logic can be used as a substitute for, or for bypassing a fault-infected ASIC block (if any) either permanently or at times when the fault-infected ASIC block is about to perform a fault-infected operation (bug-infected operation): The substitution or bypass does not have to be a permanent one that is in effect at all times for the entirety of the fault-infected ASIC block. Instead affected outputs of the faulty ASIC block can be disabled from working just at the time they would otherwise initiate or propagate an error. Such fault-infected operations of the temporarily deactivated ASIC block(s) may be substituted for by appropriately programmed pro-Logic at the appropriate times.

29 Claims, 5 Drawing Sheets

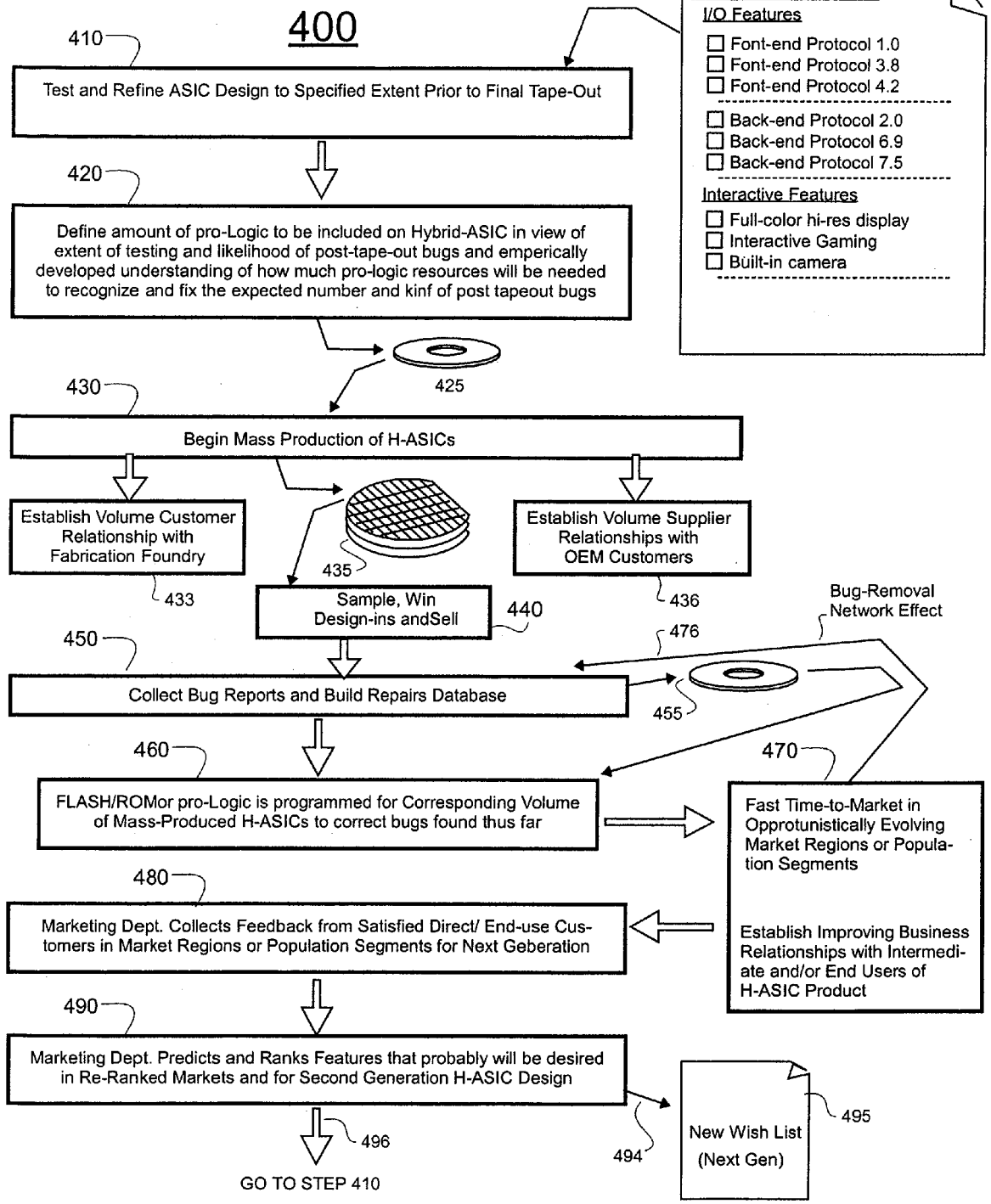

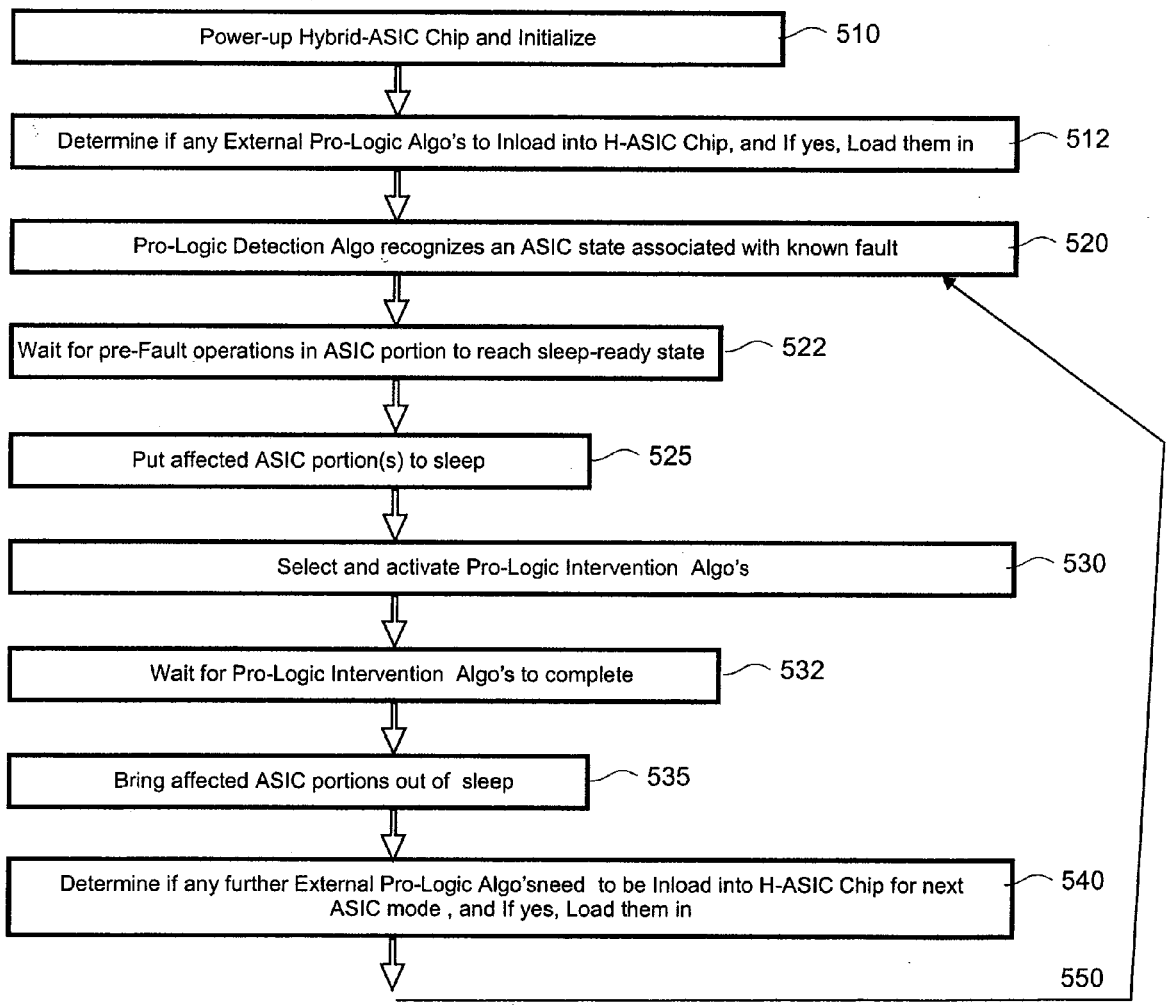

ASICS HAVING PROGRAMMABLE BYPASS OF DESIGN FAULTS

REFERENCE TO EARLIER-FILED APPLICATION

The present application is a continuation of U.S. Ser. No. 11/047,179 filed Jan. 31, 2005 which issued as U.S. Pat. No. 7,426,708 on behalf of James T. Koo entitled, "ASICs Having Programmable Bypass of Design Faults," which is hereby incorporated by reference in its entirety and benefit of which parent's filing date is hereby claimed.

FIELD OF DISCLOSURE

The present invention relates generally to Integrated Circuits (IC's), more specifically to Application Specific Integrated Circuits (ASIC's) and yet more particularly to the design, manufacture and distribution of ASIC-based devices for use in rapidly changing consumer markets where the ASIC-based devices may include a relatively small design or manufacturing flaw in a fixed logic portion thereof.

DESCRIPTION OF RELATED ART

Time-to-market and the costs involved in getting to market can be critical factors for commercial success when considering the production and distribution of many electronic devices. Any scheduling setback, even if due to the smallest of design errors (design bugs), can be disastrous for a company that needs to get its product successfully into the hands of customers or consumers in time for a market-driven deadline, such as being in time for a major gift-buying holiday or a promotional campaign. Market-driven deadlines also include those of being first to market with a new concept before a competitor does so instead.

Low cost electronic products such as those sold to mass consumer markets often include ASIC's (Application Specific Integrated Circuits) and ASSP's (Application Specific Standard Products) with fixed circuit and interconnect structures, where the circuitry can include analog and/or digital components. Conventional ASIC/ASSP methodology relies on libraries of so-called, "standard cells" or "standard products" respectively. These libraries contain large numbers of pre-designed circuits (basic building blocks). When a new consumer product is designed to be ASIC-based, that is, to include a plurality of standard cells or one or more complete ASIC's or complete ASSP's, a subset of the pre-designed cells/products will typically be chosen from available libraries for inclusion in the operative circuit space of the to-be-manufactured, monolithic integrated circuit (IC) and for use in a predefined consumer application (e.g., cell phone, PDA, video/music recorder/player, etc.). After the subset of cells/products are selected, one or more copies of those chosen building blocks will be frugally laid-out in the IC circuit space, adjacent to appropriate other blocks and stitched together with interconnect in a fixed architecture manner to thereby construct more complex circuits within the IC. It is desirable to use a relatively minimal number of building blocks because IC circuit space is considered expensive. Examples of digital ASIC standard cells include multi-bit adders, multipliers, multiplexers, decoders, and memory blocks (look-up tables). Examples of analog ASIC standard cells include amplifiers, comparators, analog-to-digital and digital-to-analog converters. ASIC's may include mixed signal designs (IC's having both analog and digital circuitry on the same substrate).

Standard cells are generally hardwired, pre-tested and pre-designed for maximum compactness relative to the general purpose applications in which they are expected to be used. This form of optimization is generally not perfect because specific ones of the general purpose applications may nonetheless call for different switching speeds, frequency ranges, voltages, currents and fabrication technologies. So a standard cell is rarely the most optimally compact and efficient design for a specific application. However, it is adequate enough, given the diminishing returns involved in tradeoff with further redesign and optimization efforts. One advantage of using standard cell libraries is that there is little guess work or surprise in determining whether each standard cell will work alone for its intended purpose or whether it will use up far more circuit space than may generally be necessary for realizing a desired function. The cells have been pre-tested and tweaked for meeting that goal in the general sense.

Despite all this, situations arise where a small, error-containing design (a buggy design) is inadvertently stitched into the hardwired fabric of an ASIC-based system, or a small error is made in stitching these ASIC standard cells together. Even one small error can mean that the whole of the ASIC-based design becomes unacceptable. Depending on when the error is uncovered in the process of design, production and distribution, the error can have disastrous consequences for a company that is trying to sell the ASIC-based device at a time when the company is short on budget and/or short on time and therefore needs to get its product successfully into the hands of consumers or customers as soon as possible, at low cost and before a competitor does better.

This is where alternative approaches such as those of using an all-FPGA or all-PLD design have the advantage. The programming for these programmable devices (especially the re-programmable ones) can often be changed to correct many uncovered errors. Nonetheless, the use of ASICs is still preferred over FPGAs or PLDs in many situations because ASIC standard cells tend to have much shorter signal propagating times and lower mass production costs when compared against the all-programmable alternatives under the constraint of similar device dimensions (e.g. transistor channel lengths) as used within the corresponding fabrication technology.

Consumer markets tend to be very fluid and fickle. One day, the consuming masses want one kind of function in their favorite consumer product (be it a new cell phone or a new PDA, for example) and the next day, perhaps simply due to whim, they change their minds and demand a very different kind of function. This is a very dangerous situation for ASIC-based manufacturers and marketing managers. A warehouse full of what, on one day is highly-demanded product, can become worthless overnight as the winds of consumer demand shift directions. Therefore it is critical for ASIC manufacturers to get their designs correctly finished the first time—without errors or bugs, and to get them produced and distributed into the market as quickly as possible without encountering any scheduling setbacks.

By way of a more specific, but hypothetical example, consider a case where a circuit designer has been instructed by the marketing department to use a new kind of data-inputting standard in the company's upcoming ASIC for processing input data streams (say RF wireless transmissions) that are organized according to a corresponding, new industry standard protocol where the protocol has just been adopted or is expected to soon be adopted. However, because the protocol and ASIC cells are so new, the designer makes a minor error in the implementation. Ninety nine percent (99%) of the ASIC design is good, but there is one rare set of state conditions where the design fails to behave correctly. The mistake is not detected until after the ASIC design has been taped-out and put into mass production and distributed to warehouses around the world, or worse yet, has been embedded into consumer products and sold in large numbers. It becomes very embarrassing to all the companies involved to now admit the mistake and recall the products. It is also very costly to do so. The company that designed the 99%-good ASIC can lose its reputation and perhaps all future business even though 99% of its efforts had been perfect. Just one small mistake, one small design bug, can destroy the good will of the company in the eyes of others. As a result, this company is not able to sell more product and it goes under.

Quite often, so-called network effects come into operation under these conditions. A competitor who offers an error-free alternative, even if it is inferior in overall performance to the 99% good/1% buggy competing device, can take an initial and commanding lead in the relevant market sector. This initial lead eventually translates into the competitor's design becoming the dominant one in the given market space because interoperative other devices are then designed to mate first and foremost with the market leader.

In order to deal with the disastrous consequences of having one or a few small design errors creep into a rush project, some designers have suggested shifting to the use of in-field fully-reprogrammable logic or analog devices. Field programmable devices (FPLD's, FPGA's, CPLD's, etc. in the digital world) are the complete antithesis of the full-ASIC approach. Essentially all of the logic-implementing circuitry in an FPLD is reprogrammable such that it can usually be reprogrammed to implement alternative, error-free functions. Manufacturers can theoretically load into their fully-reprogrammable chips, whichever of design correcting patches that may be needed as obscure design flaws (bugs) are uncovered over time. The problem with the field-reprogrammable approach, however, is that the fully-reprogrammable circuitry tends to be more expensive, larger in size, slower in response time and prone to various problems which ASIC circuitry does not generally suffer from. One such problem is that of having flawed software load into one or more of the many configuration memory cells (or fuses or anti-fuses) of a field-reprogrammable device due to noise or other problems during the configuration loading time. Then the fully reprogrammable device fails to work properly just because of the one configuring flaw. By contrast, because the logic implementing parts of an ASIC standard cell are basically not programmable (not programmable to the same generic extent as are the counterpart, fully-reprogrammable gate arrays), it is not as prone to the wrongful configuration problem. Also, the ASIC design does not need to consume as much circuit space, electrical power and/or signal routing resources as does a fully-programmable (or fully re-programmable) field device for supporting configuration memory and its programmability or re-programmability. Thus the ASIC solution tends to be more reliable, more compact, less expensive and more energy efficient.

Recently, a movement has begun towards a mixed genre referred to as "hybrid" ASIC-FPGA. The idea is to have some circuitry implemented as ASIC standard cells and other operative circuitry implemented as fully-field-programmable gate arrays. The specific mix and nature of such proposed hybrid approaches is not well defined. The term "hybrid ASIC" as used below is not to be confused with the more generic name which is applied to the above, mixed genre concept.

SUMMARY

In accordance with one aspect of the present invention, a relatively small amount of programmable or reprogrammable logic is included in a mostly-ASIC and/or mostly-ASSP device (a hybrid ASIC, as it is referred to below) so that such re/programmable logic can be used as a substitute or temporary bypass for a fault-infected ASIC block (if any) or for a fault-infected ASSP block (if any) at times when the fault-infected ASIC/ASSP block is about to perform a fault-infected operation (bug-infected operation). The substitution does not have to be a permanent one for the entirety of the fault-infected ASIC block. (ASIC block will be used herein to represent fixed structure circuitry, including but not limited to standard cells and standard products of digital, analog or mixed signal nature.) Rather, the faulty ASIC block (or just an output thereof) can be deactivated from working just at that the time of a known fault and its fault-infected operation will be substituted for by an appropriately programmed, programmable logic or other circuit section only when the fault in the faulty ASIC block is going to adversely affect system results. Thus, a fault-infected ASIC block that is 99% good (for example) and operates improperly just 1% of the time can continue to be gainfully used for that 99% of the time when its operations are fault free and can be blocked from having its erroneous output used only in the 1% time periods (example) when its behavior is faulty. During those faulty times, a relatively small amount of re/programmable logic or re/programmable other circuitry can be used as a fault-correcting substitute or bypass for the fault-infected ASIC block. (Alternatively or additionally, the re/programmable circuitry can be used to generate a fault-correcting machine state or fault-correcting new data within the ASIC-based circuitry so that when the temporarily deactivated, ASIC-based circuitry is reactivated, it will appear as if the faulty operation had not occurred.)

On the other hand, in some cases a faulty ASIC block may not at all be needed for functional operation of the rest of the ASIC-based design. The faulty ASIC block may have been thrown in as a nice-to-have bell or whistle. In such a case, the faulty and unnecessary ASIC block may be permanently deactivated and bypassed by a programmable logic section (hereafter, also pro-Logic and described in more detail below) so that the unnecessary, faulty ASIC block (the bad 1%) does not interfere with the fault-free operations of the remainder of the ASIC-based design (the good 99%). A concrete example would be an error-detecting ASIC block that improperly has a very high false-positive, error detection rate and that interferes with proper processing of data that has been scanned for error even though such data has no error. In accordance with the invention, such a bad error-detecting ASIC block would be permanently deactivated and bypassed by the pro-Logic section so that the rest of the hybrid ASIC can function properly without interference from this unnecessary and interfering ASIC block. Alternatively, the pro-Logic section may be used to implement a corrected, error detecting circuit. In view of the above, it can be seen that the re/programmable logic part of a hybrid ASIC can be appropriately programmed with corrective and/or bypassing logic functions after corresponding faults in one or more ASIC blocks of the hybrid ASIC have been discovered. Such discovery can occur after the hybrid ASIC is manufactured.

On yet a further hand, in some cases an ASIC-based design may not have a faulty ASIC block. Rather, after manufacture, designers conceive of a better way to implement the design, where the better way is perhaps more energy efficient and/or is faster than the design that is already implemented in the ASIC portion of the hybrid ASIC. In such a case, rather than repairing a fault, the designers may elect to use the pro-Logic section to improve on operations of the already manufactured hybrid ASIC, providing the pro-Logic section has sufficient resources to implement the improved design.

A method of distributing or using hybrid ASICs (part ASIC-based, and partly including programmable integrated circuits) in accordance with the invention includes the steps of testing the hybrid ASICs after they are produced and/or installed in larger systems; and in the event that one or more faults are discovered within a corresponding one or more ASIC blocks of the hybrid ASIC by such testing, programming the once-programmable or reprogrammable logic circuitry of the hybrid ASIC to detect or anticipate the fault-infected state(s) of the one or more fault-infected ASIC blocks and to provide corrective operations as utilized substitutions for, or corrective additions to, the fault-infected operations the ASIC blocks that have been uncovered as having such faults in them. In one embodiment, the programming of the re/programmable logic in the hybrid ASIC is performed in situ, after the hybrid ASIC has been embedded in a larger and remotely located system.

Other aspects of the invention will become apparent from the below detailed description.

BRIEF DESCRIPTION OF THE DRAWINGS

The below detailed description section makes reference to the accompanying drawings, in which:

FIG. 4 is a flow chart illustrating how hybrid ASICs may be used in accordance with the invention; and FIG. 5 is a flow chart illustrating how detecting and intervening parts of reprogrammable logic may intercede when fault-infected ASIC block(s) is/are about to perform a fault-infected operation.

DETAILED DESCRIPTION

Figure 1:
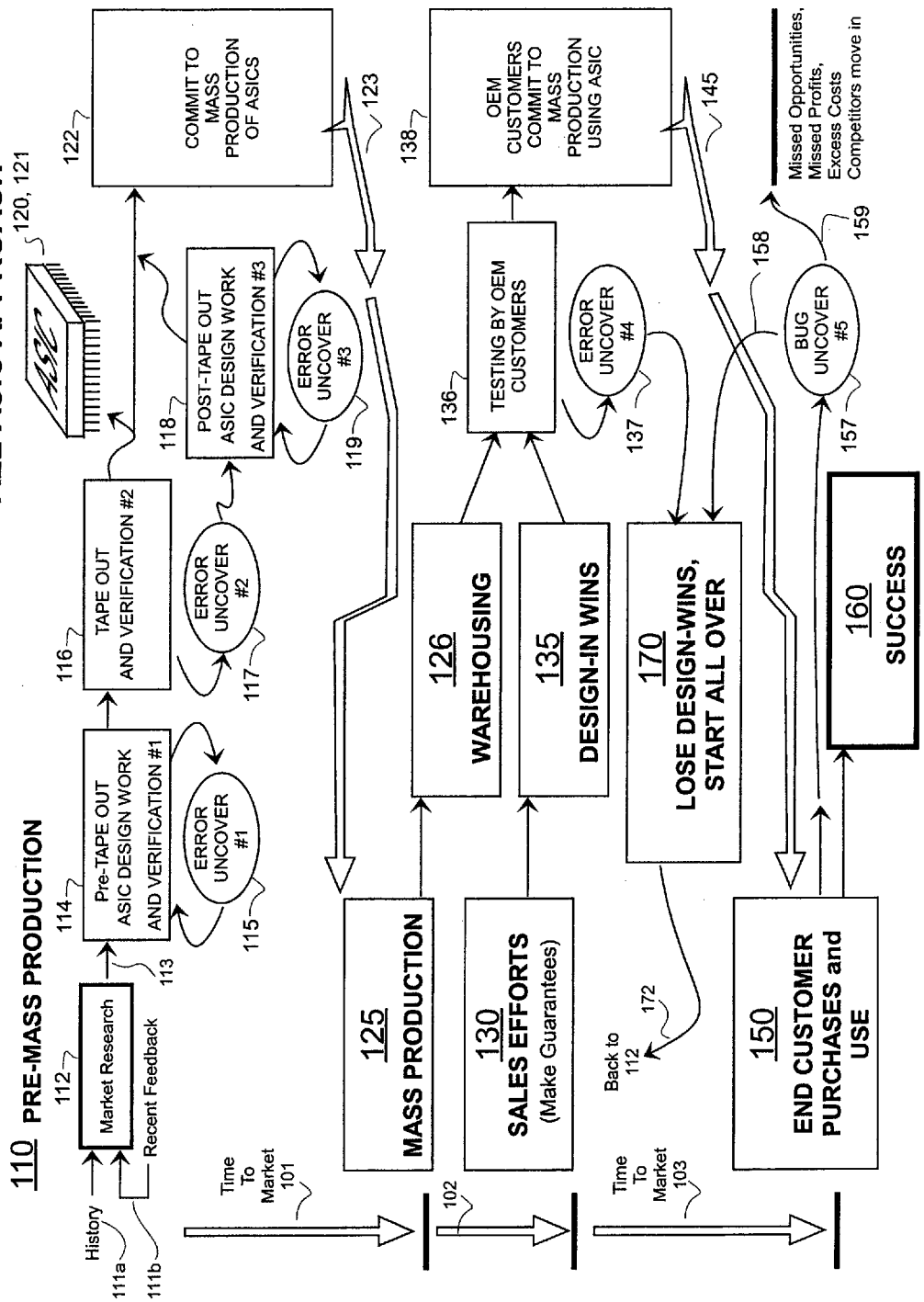
FIG. 1 is a block diagram of one possible production and distribution flow where an all-ASIC integrated circuit is designed, mass produced and installed in consumer products.

FIG. 1 is a flow chart illustrating a possible flow 100 of design work and production work of an ASIC device. In FIG. 1, an all-ASIC integrated circuit (120) is being designed, mass produced and distributed under supervision of a design company for use in consumer electronic applications. Steps 111a-119 belong to a pre-mass-production phase 110. In step 112, a marketing department of the design company collects both long term, historical information 111a and recent feedback information 111b from potential customers. The collected information is used for carrying out market research and generating a prediction 113 of what features will most likely be desired by original equipment manufacturers (OEM's) and/or end-use customers in the new ASIC 120 that the company is planning to soon produce.

In step 114, design engineers receive the design specifications (113) from the marketing group and begin a pre-tapeout phase 114 of their work. Although it is drawn as a small iconic box, step 114 may involve a large investment in man-hours and very detail oriented work. ASIC standard cells are selected, customized and stitched together to form respective ASIC blocks which are further weaved together to define the overall ASIC circuitry. Numerous simulation and/or verification tests will typically be performed during step 114 with the aid of ASIC-supporting software to assure that the design will work as intended. If this first round of verification testing reveals a design error 115, then the still-in-software design will be reworked within step 114 until all the apparent bugs are removed. Despite the best of intentions and careful attention to details, not all design errors or faults will necessarily be caught in this pre-tapeout work phase 114-115. It is generally not possible to exhaustively test all possible combinations of inputs under all possible situations.

Tape-out step 116 includes the manufacture of an actual set of first prototypes 120 of the designed ASIC. The first prototypes 120 (e.g., first silicon) are run through a second round of verification tests. Those skilled in the art will appreciate that yet further design bugs or operation errors 117 may be uncovered in this second round of verification tests despite the care taken in the first round of verifications 114. Then, it is back to the drawing board (so to speak) in the post-tapeout re-design work of step 118. This may be followed by a third round of verifications and error discoveries 119. Yet another round of tape-out and testing of the second round prototypes 121 may follow. Ultimately, the original reworked prototypes (120 or 121) are deemed to be production ready and a commitment is made at step 122 to go into mass production.

The commitment 122 is not made lightly or with thoughtless haste. The amount of monies being invested in the ASIC development project now ratchets up to a new quantum level well above what was needed for design. Manufacturing slots are procured (step 123) on a chip fabrication line and new problems, attendant with mass production, are resolved. At the time that the commitment 122 is made to go into mass production, a fresh look is taken at the current marketing predictions 113 and the amount of time 101 that has elapsed thus far simply to get to the mass production stage 125. More time 102 will be needed for sales efforts 130 and design-in wins 135 and yet further time 103 will be consumed before the ASIC design wins acceptance (150) from OEM and end-use customers. The marketplace may change in the interim. Windows of opportunity may begin to close. So it is imperative that the mass production (125) and sales efforts (130) move along without any unexpected delays or setbacks.

It can be very disappointing at this stage to discover that yet a new bug 137 has been unearthed in the ASIC design just as large stockpiles are accumulating in the warehouse 126 and just as the sales force is being deployed out in the field to fight (130) for new design-in wins 135 and to make guarantees or commitments to OEM customers about the worthiness of the new product (120 or 121). It can be highly embarrassing to the design company if an OEM customer discovers the new error 137 while testing the ASIC as it sits in a larger, customer system (e.g., an application-specific printed circuit board). Not only will that OEM customer be displeased, but word may leak out to the larger community of the error 137. Suddenly, the design company may find itself facing the disastrous situation 170 of losing all of its hard-won design-ins and of having to start anew (172), perhaps going all the way back to step 112. The design company will have lost all the time 101-102 invested thus far, and all the resources invested in steps 112-136. For many a small company, this will be the end of their existence because they cannot afford to start all over again. They cannot get new funding in light of their past performance. The greatest part of the misfortune may be that the error 137 uncovered in this late phase 136 of product development is an obscure one; one that occurs perhaps less than 1% of the time for certain obscure machine states. More than 99% of the ASIC design is fault free. This one obscure fault 137 ruins everything for the design company.

If the in-system testing 136 that is conducted by the OEM customer(s) runs successfully, then at step 138, the OEM customer(s) who are planning to use the ASICs (sitting in warehouse 126) will commit to mass production of their products, with each such OEM product containing one or many copies of the given ASIC (120 or 121). This will be an important milestone for the fledgling, ASIC design company because now, after having passed through all the dicey time-to-market hurdles: 101, 102 and 103; they will finally start selling off substantial parts of their accumulated inventories 126. Their ASIC will finally get into the hands of end-users (distribution and purchase steps 145-150) and perhaps the reputation of the ASIC design company will grow with customer satisfaction, leading to even more success 160. Of course there is the remote possibility that some end-use customer will uncover yet a further and hitherto unseen design flaw or bug, 157. Perhaps the design flaw 157 is a very obscure one; one that occurs perhaps less than 0.1% of the time for certain obscure machine states. More than 99.9% of the ASIC design is fault free. This one obscure fault 157 can once again ruin everything for the design company and also for the OEM customer(s) that have embedded the ASIC in their OEM product(s). If the end-user has located the ASIC-using system in a remote location where its operability is mission critical and the cost of fixing a problem is extremely high, substantial liabilities may flow from the obscure bug (e.g., occurs less than 0.1% of the time). Everyone loses when path 158 leads to product failure, product recall and large losses.

Outcome 159 summarizes some of the losses suffered by those involved when obscure design faults such as 117, 119, 137 and 157 are uncovered after tape-out and/or mass production. Not only is there a loss of the time spent 101-103 getting to market, but the bottom line outcome 159 further includes the loss of reputation and the missed opportunities for future success 160. The obscure and late-found bugs 117-157 open a window of opportunity for competitors to move in and take the lead in the emerging market. Thus, the smallest of design faults (e.g., 157) can lead to large losses for all those involved in the design, mass production, distribution and/or use of the ASIC 120/121.

Figure 2:
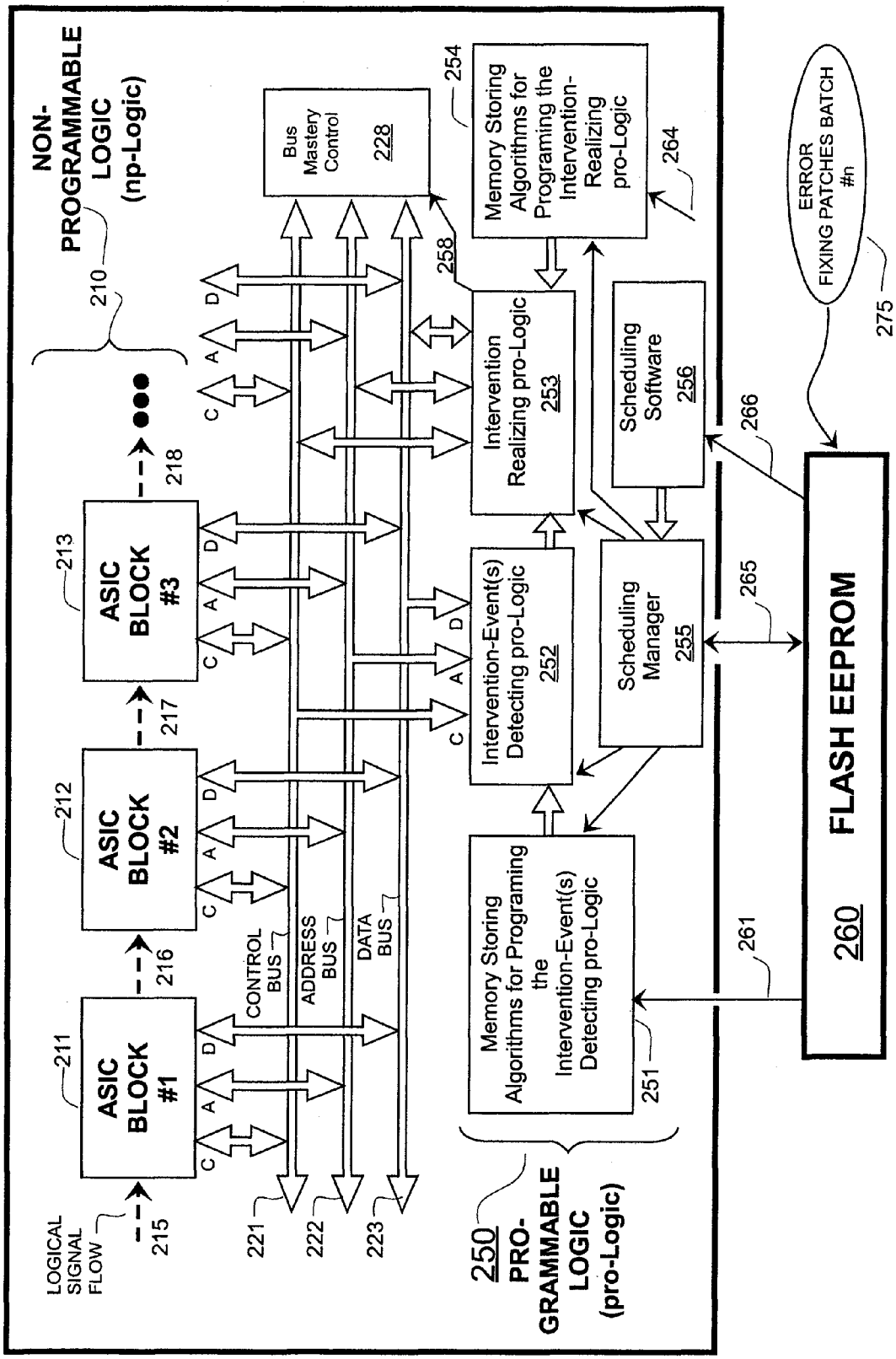
FIG. 2 is a schematic diagram of a FLASH-revisable hybrid ASIC in accordance with the invention.

FIG. 2 is a schematic diagram of a FLASH-revisable hybrid ASIC 205 structured in accordance with a hybrid approach 200 of the invention. In the illustrated hybrid ASIC 205, the upper part 210 contains logic that is not substantially programmable with regard to its logic structure (where such a substantially non-programmable logic section is hereafter also referred to as np-Logic 210). The lower part 250 contains logic that is programmable (hereafter, also pro-Logic 250). For one class of embodiments, at least about 75% of the on-substrate logic area in the hybrid ASIC is of the np-Logic type 210 and less than about 25% of the on-substrate logic area is of the pro-Logic type 250. In a subclass of such embodiments, at least about 90% of the on-substrate logic area is of the np-Logic type 210 and less than about 10% of the on-substrate logic area is of the pro-Logic type 250. In a subsubclass of such embodiments, at least about 95% of the on-substrate logic area is of the np-Logic type 210 and less than about 5% of the on-substrate logic area is of the pro-Logic type 250.

As used herein, the term, "non-programmable logic" (np-Logic 210) does not mean that there is absolutely no portion of np-Logic section 210 that can be programmed in some way. The np-Logic section 210 may contain programmable RAM sections, programmably-actuated switches and so forth. However the np-Logic section 210 is structured such that those skilled in the art will recognize it as being a substantially ASIC design, having substantially little in the way of programmable flexibility when compared to PLA's (programmable logic arrays), PAL's, PLD's (programmable logic devices), CPLD's (complex PLD's), FPGA's (field programmable gate arrays) and other such re/programmable logic means.

By contrast, the lower pro-Logic portion 250 of the illustrated hybrid ASIC 205 does contain logic circuitry that is substantially programmable in the same sense that PLA's, PAL's, PLD's, CPLD's, FPGA's, PROM's and the like are programmable in terms of the logic functions they will implement and in terms of the programmable interconnections that will be provided between their programmably defined logic functions.

In one embodiment, the pro-Logic section 250 includes programmable detection logic 252 for detecting data or ASIC machine states that qualify for intervening override and/or additive correction. The pro-Logic section 250 further includes programmable actuation logic 253 for implementing the intervening override (and/or additive correction) operations when called upon to do so by the detection logic 252. Since each of the detection logic 252 and actuation logic 253 is programmable, a substantial amount of flexibility is provided for defining how intervention-qualifying states will be detected or anticipated and how the intervening override (and/or additive correction) operations will be carried out. Although the detection logic 252 and actuation logic 253 are illustrated as separate sections for purpose of explanation, their circuits may be closely intermingled.

Memory regions 251 and 254 are optional and these may be used in the case where the corresponding detection logic 252 and/or actuation logic 253 is/are of the reprogrammable type such that the same logic section 252 and/or 253 can be reused to carry out different detection or actuation functions at different times simply by reprogramming them. In that case, the on-chip memory regions 251 and 254 may be used for temporarily and/or nonvolatilely storing configuration data for loading into the reprogrammable sections 252 and 253. Memory regions 251 and 254 are not necessarily exclusively dedicated to servicing the pro-Logic section 250 of the hybrid ASIC. They may overlappingly service data read and/or data write operations of the non-programmable ASIC section 210. The amount of memory capacity that is reserved for servicing needs of the ASIC section 210 versus servicing needs of the pro-Logic section 250 may be programmably adjusted in response to various application specific requirements. It does not have to be fixed.

In one embodiment, a scheduling manager 255 is further included in the hybrid ASIC 205 for scheduling the system time frames or states during which units 252, 253 will be loaded with new data, either from the on-chip memory regions 251, 254 respectively or from an off-chip memory means such as the illustrated Flash EEPROM 260 or external sources via 265. The scheduling manager 255 may also decide what portions of the available reconfiguration data in memories 251, 254 and/or 260 will be loaded into what reprogrammable parts of detection logic 252 and/or actuation logic 253. The scheduling manager 255 may additionally manage the inloading of new or additional configuration data 275 (error(s)-fixing batch number #n) from an external source (not shown) into the on-board memory 260 via 265. The scheduling manager 255 may additionally manage the transfer of additional configuration data from on-board memory 260 that may have capability of communicating with external data 275 to the on-chip memories 251, 254 and/or directly into selected reprogrammable parts of detection logic 252 and actuation logic 253. Scheduling manager 255 may itself be partly reprogrammable such that new scheduling software can be inloaded from on-chip memory 256 and/or from the external memory 260 as dictated by already loaded (typically nonvolatile) scheduling software. While not explicitly shown, it should be appreciated that the scheduling manager 255 will have or can request mastery over the sharing controls of the shared buses (221-223 and also over shared I/O resources discussed below) of the hybrid ASIC as needed for carrying out its respective operations and may have capability communicate with external input sources via 265 in addition to Flash EEPROM 260, or the Flash memory 260 having the capability of communicating with external data sources. Although just one external memory device 260 is shown operatively coupled to the external interface means (261, 265, 266) it is to be understood that the external interface means can, in one embodiment, interface with a plural number of external memory devices and the scheduling manager 255 can be made responsible via its configuration for determining which one or more of the external memory devices will be providing initial, additional or substitute configuration data for the pro-Logic section 250.

In one embodiment, the Intervention-event(s)-detecting pro-Logic 252 will detect the presence of specially coded data that is indicative of new programming data being sent over one or more busses of the hybrid ASIC (or presented at input pins) where the new programming data is to be treated differently than normal work data that is to be normally processed by the hybrid ASIC. The new programming data from external source(s) is to be loaded into the Flash EEPROM 260 and/or into memory sections 251 and 254 for defining alternative or additional intervention-deserving events and/or for defining alternative or additional intervention-realizing processes. This allows for in-situ repair or reprogramming of the hybrid ASIC system 205. Such in-situ repair or reprogramming may be carried out by way of remote control where the hybrid ASIC 205 is operatively mounted on a circuit board of a remotely located end-use system (not shown) and the new programming data is sent to the hybrid ASIC via a wired and/or wireless network connection.

It may be appreciated from the above that a highly flexible and robust, on-chip subsystem 250 may therefore be provided for detecting error causing data, erroneous or bug-infected machines states of the ASIC portion 210 and/or detecting states preceding those that may qualify for immediate or delayed intervention by the overriding or additively correcting parts of the intervention realizing pro-logic section 253. The pro-Logic section 250 may occupy a relatively small part of the overall circuit area of the hybrid ASIC 205 (e.g., less than about 10% or about 5% or about 1%) because its primary purpose is that of programmably bypassing or otherwise correcting obscure design bugs (e.g., 137 and 157 of FIG. 1, or even 117 of FIG. 1 thereby avoiding time-consuming step 118) that may or may not be uncovered during normal, pre-mass-production testing (e.g., 114-119 of FIG. 1). Most of the on-substrate circuit area of the hybrid ASIC 205 may be occupied by the more space-efficient ASIC-type of circuitry. The amount of ASIC-type of circuitry (210) versus pro-Logic circuitry (250) provided in the limited circuitry area of the hybrid ASIC 205 may be predicated empirically on the amount of verification done (e.g., steps 114-119) prior to mass production (125) versus the likelihood that an obscure bug (e.g., 157) will show up and the expected amount of detection and correction pro-Logic needed fix the problem.

The on-chip and optional, memory sections 251, 254 and 256 may each be implemented as ROM or EEPROM or SRAM or even DRAM (or mixtures thereof) depending on application. The intervention-event detecting/anticipating pro-logic section 252 and intervention realizing pro-logic section 253 may each be implemented with fused, antifused configuration means. Configuration data within sections 252-253 may be once programmed as ROM data or multiply reconfigured as RAM data (or mixtures thereof) depending on application. Various other types of volatile and/or nonvolatile memory technology may be used, including but not limited to: MRAM technology (magnetic) and FRAM technology (ferroelectric). Selective activation and deactivation of parts of the pro-Logic section 250 may be made by way of selectively blowing fuses, selectively closing anti-fuses, ROM programming, EPROM, and/or EEPROM re-programming (e.g., FLASH programming). A large inventory of unprogrammed ASIC's may be maintained as backup and an appropriate portion of that large inventory may be programmed with bug-correcting data as customers continue to use the chip and amass new information about uncovered bugs.

Although not every hybrid ASIC has a global control bus, or a global address bus and/or a global data bus such as is shown in FIG. 2 at 221, 222 and 223 respectively, it is common for ASIC designs to use such global communication means on a time-multiplexing basis for allowing various ASIC blocks (e.g., 211, 212, 213) to communicate with one another. It is common to further have a bus mastering protocol or a bus mastering means 228 which can be used to allow a given ASIC block to assert temporary control over the global communication buses 211-223. In one embodiment, the intervention-realizing pro-Logic section 253 includes an operative coupling 258 to the bus mastering means 228 so that the intervention-realizing pro-Logic section 253 can request or assert mastery over the global buses 221-223 as needed and use the controlled buses to implement a substitute operation for a fault-infected ASIC block (and/or a corrective pre- or post-action).

Alternatively or additionally, one or both of the intervention-event detecting/anticipating pro-logic section 252 and intervention realizing pro-logic section 253 may be operatively coupled to shared I/O pins or shared I/O interface blocks that also service the ASIC section 210 instead of the dedicated channels 261, 265 and 266. It is common for ASIC designs to include shared I/O blocks (not shown) that can be used on a time-multiplexing basis for allowing various ASIC blocks to access the finite pinout of the device package. The pro-Logic part 250 of the hybrid ASIC may include appropriate couplings to such shared I/O resources for use in the intervention-event detecting/anticipating operations of pro-logic section 252 and/or the intervention realizing operations of pro-logic section 253 and/or the re/programming operations of one or more of memories 251, 254 and 260. The structuring is substantially the same as that shown for the shared C, A, D busses 221-223 and thus is not shown by way of additional illustration. Typically, the shared I/O resources of a given IC will be coupled directly or indirectly to the shared interconnect resources (e.g., 221-223) of the IC. Those skilled in the art will appreciate from the above, that of course, the intervention realizing pro-logic section 253 and/or programming schedule manager 255 can have or request mastery over the shared I/O resources (not shown) of the hybrid ASIC as needed for carrying out their respective operations instead of I/O channels of 261, 265, and 266.

In terms of a more specific example of how detection and intervention my occur, the np-Logic section 210 of hybrid ASIC 205 may have been designed to process data sequentially such as shown in FIG. 2 by the dashed, data flow lines 215, 216, 217, 218, etc. In actuality, each of ASIC blocks 211-213 will more normally fetch input data from the global data bus 223 at appropriate time-multiplexed times (as may be signaled by the control and/or address buses 221-222) and will output corresponding output data to the global data bus 223 at appropriate further time periods. Processed data therefore sequences back and forth from the global data bus 223 to a next ASIC block and back out to the global data bus 223 on a time-multiplexed basis in the more common situations. (Alternatively or additionally, different data lines within the data bus may be assigned for carrying different data words.) It is also within the contemplation of the invention to interject breakpoint circuitry between ASIC blocks that do interact without using common busses, where the breakpoint circuitry (not explicitly shown) allows the pro-Logic section 250 to perform its detection and/or intervention operations between such ASIC blocks.

When one or more fault-infected ASIC operations is about to occur and/or is occurring, the intervention-event detecting/anticipating pro-Logic section 252 detects the condition(s) and signals the intervention-realizing pro-Logic section 253 accordingly. The intervention-realizing pro-Logic section 253 asserts control over the global buses 221-223 via coupling means 258 and mastery means 228 at the appropriate time (which time may be delayed a predefined number of system clock ticks after detection occurs). Alternatively or additionally, the intervention-realizing pro-Logic section 253 may assert control over nonglobal busses (not shown) by use of the interjected breakpoint circuitry (not shown) to provide similar effects as may be appropriate. Pro-Logic section 253 then inserts its substitutive or correcting output signals into one or more of the global buses 221, 222, and 223 (and/or nonglobal busses—not shown). The error-producing output of the fault-infected ASIC block (e.g., block 212) will typically be disabled at this time by action of one of detection and realization pro-Logic sections 252/253. Alternatively, the entire fault-infected ASIC block (e.g., block 212) may be disabled at this time to thereby conserve power. Other ASIC blocks (e.g., block 213) and/or various ones of their outputs may also be disabled at this time by action of one of detection and realization pro-Logic sections 252/253. After correction, the disabled ASIC circuitry is released to continue with its normal processing. The fault-infected operations of the fault-infected ASIC block(s) are therefore substituted for by fault-free operations implemented in the pro-Logic section 250 and/or the fault-infected result signals output by the ASIC block(s) are substituted for by fault-free result signals output as corrective substitutes by the pro-Logic section 250.

Figure 3:
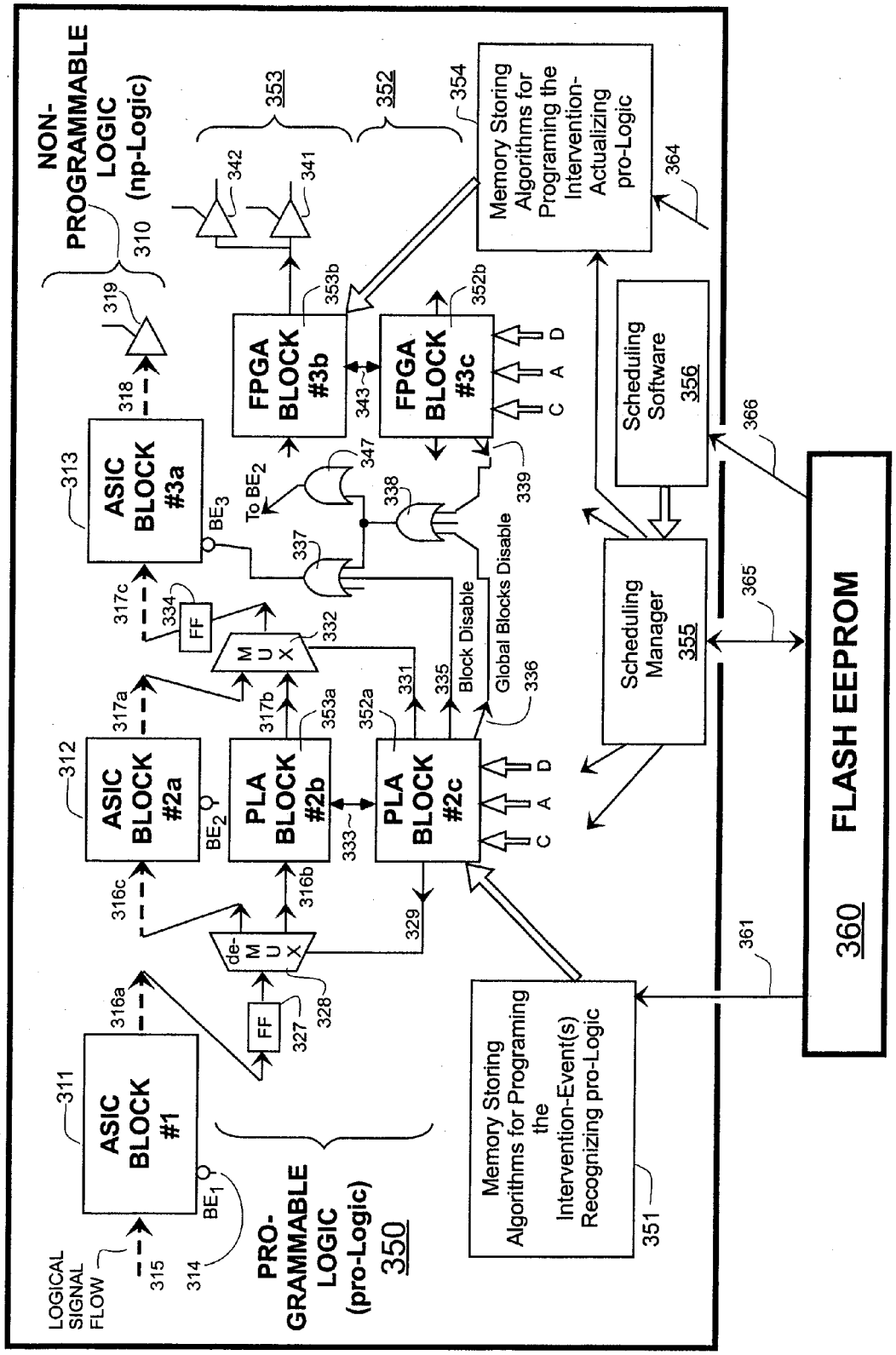
FIG. 3 is a schematic diagram showing further details for one embodiment of the FLASH-revisable hybrid ASIC of FIG. 2.

Referring to FIG. 3, a schematic diagram is provided of a FLASH-revisable hybrid ASIC 305 structured in accordance with a hybrid approach 300 of the invention. In the illustrated hybrid ASIC 305, the upper part contains substantially non-programmable, ASIC logic (np-Logic 310). The lower part contains logic that is programmable (pro-Logic 350). Where practical, like reference numbers in the "300" century series are used for elements having similar counterparts in FIG. 2 but numbered in the "200" century series. As such, a repeat description is not needed for elements 351, 354, 355, 356 and 360.

It may be noted that the intervention-realizing pro-Logic section 353 contains a plurality of re/programmable blocks such as 353a and 353b and that this on-chip inventory of re/programmable blocks is not necessarily homogeneous. In the illustrated example, actuation block 353a is a PLA (programmable logic array, or alternatively it may be a PAL, which is a slightly less programmable combination of AND and OR arrays). By contrast, actuation block 353b is an FPGA (field programmable gate array) which is a much more complex and larger type of programmable logic device than is a comparable PLA or PAL. The scheduling software 356 can choose among the different types of programmable logic available in the unused inventory portion of actuation section 353 to pick those that are suited for the actuation job at hand during a given mode of operation of the hybrid ASIC 305. Although just PLA and FPGA are shown for purpose of illustration, the programmable logic inventory of actuation section 353 may alternatively or additionally be stocked with other kinds of programmable logic, including but not limited to: PAL, PLD, SPLD, CPLD, GAL, and even simple RAM or ROM decoders.

It may be further noted that the intervention-event detecting/anticipating pro-Logic section 352 contains a plurality of re/programmable blocks such as 352a and 352b and that this on-chip inventory of re/programmable blocks is not necessarily homogeneous. In the illustrated example, detection block 352a is a PLA. By contrast, detection block 352b is an FPGA. The scheduling software 356 can choose among the different types of programmable logic available in the unused inventory portion of detection section 352 to pick those that are suited for the detection job at hand during a given mode of operation of the hybrid ASIC 305. Although just PLA and FPGA are shown for purpose of illustration, the programmable logic inventory of detection section 352 may alternatively or additionally be stocked with other kinds of programmable logic, including but not limited to: PAL, PLD, SPLD, CPLD, GAL, and even simple RAM or ROM decoders.

For purpose of explanation, a demultiplexer 328 and a multiplexer 332 are shown respectively interposed along the signal input path 316a-316c and signal output path 317a-317c of ASIC block 312, with optional registration means 327, 334 such as flip flops or FIFO's included as may be appropriate. Each of ASIC blocks 311-313, etc. includes a corresponding block enable/disable terminal such as the one shown at 314. Detection block 352a (PLA block #2c) is programmed to monitor the C/A/D buses and to recognize a predefined data condition, or state or sequence of states. When such an intervention qualifying event is detected by block 352a (PLA #2c), that block issues a block disable signal to the $BE_2$ terminal of ASIC block 312 (block #2a) and also to the $BE_3$ terminal of ASIC block 313 (block #3a). For purposes of illustrative simplicity, only portions of the block disable signal trees for $BE_3$ and $BE_2$ are shown. OR gate 337 can receive individually-directed disable commands from drive lines such 335 of detection block 352a (PLA #2c). Alternatively or additionally, OR gate 338 can receive group or globally-directed disable commands from drive lines such 336 of detection block 352a (PLA #2c). The output signal of OR gate 338 feeds into an input terminal of OR gate 337 and also to an input terminal of OR gate 347. The output signal of gate 347 operatively couples to the $BE_2$ terminal. Thus a logic high ("1") to an input of OR gate 338 actuates the disabling of global or smaller group of ASIC blocks including 312 and 313. Drive line 339 is an example of how another detection block (FPGA #3c) might command a group or global disable.

Upon recognition of an intervention-deserving event, PLA #2c switches control lines 329 and 331 (of the deMUX and MUX) so that input signal 316a flows by way of path 316b into PLA block #2b (353a) instead of sequencing directly to ASIC block #2a (312) and so that output signal 317c is obtained via the MUX 332, from PLA output 317b instead of coming from output terminal 317a of ASIC block #2a (312). The output state(s) of preceding ASIC block #1 (311) may be stored in registration means 327 during the switching of deMUX 328 and MUX 332. PLA #2c (352a) then instructs PLA block #2b (353a), through operative coupling 333, to begin executing its intervention actualizing algorithm(s), which algorithm(s) has/had been preloaded into PLA block

2b beforehand. The output state(s) of PLA #2b may be stored in registration means 334 for inputting into ASIC block #3a by the way of path 317c.

When the intervention actualizing PLA block #2b finishes its operations, it signals PLA #2c, and in response, PLA #2c may switch control lines 329 and 331 (either simultaneously or separately) back to the normal mode in which the signal on line 316a couples directly (or through a synchronization register 327) to line 316c and in which the signal on line 317a couples directly (or through a synchronization register 334) to line 317c. PLA #2c may simultaneously (or at a different time) drop its assertion of the block disable command for ASIC blocks #2a and #3a. The corresponding ASIC blocks, 312 and 313, may then continue transparently with their normal operations as if nothing had happened. Alternatively or additionally, the intervention actualizing PLA block #2b may have been programmed to alter internal states (e.g., sequencing them forward) within one or more of the ASIC blocks that it had put to sleep via the block disable function. Since each of the intervention-recognizing and intervention-actualizing blocks (e.g., 352a, 353a) in the pro-Logic section 350 are programmable, the specific sequence in which their respective actions take place, and what those actions are, can vary from case to case. It is not always necessary to disable Block #3a if that section is not bug-infected and not dependent on receiving time sensitive output from Block #2a.

Also, even though FIG. 3 shows the intra-pro-Logic cooperation coupling 333 as being between first and second PLA blocks 352a-353a and corresponding cooperation coupling 343 as being between first and second FPGA blocks 352b-353b, such intra-pro-Logic cooperation is not limited to being between alike types of programmable logic blocks. It may be left up to the scheduling software 356 to determine what type of programmable logic block is used to function as an intervention-recognizing block and/or as an intervention-actualizing block and/or as an intervention-coordinating block (where the last determines if and when various ASIC blocks will be put to sleep and how various signals like 316a will be re-routed). A single FPGA block can simultaneously carry out all three of these functions. The above description has been presented as an explanatory example.

Those skilled in the art will appreciate that an actual deMUX such as shown at 328 is not necessary for allowing PLA #2b to respond to the signal on line 316a and for preventing ASIC block #2a from responding to that same input signal 316a. Instead, the mere selection of output 317b instead of output 317a, or mere disabling of ASIC block #2a (via $BE_2$) and enabling of PLA block #2b can be used to achieve a similar result where both of blocks 312 and 353a are operatively coupled to receive input signal 316a. The deMUX 328 is shown for the sake of quicker understanding of the concept.

Similarly, those skilled in the art will understand that a variety of different means may be used to realize the output signal routing function of MUX 332. By way of example, both the ASIC blocks (e.g., 313) and the programmable logic blocks (e.g., 353b) may have tri-stateable outputs such as indicated at 319, 342 and 341. Such tri-state drivers may be respectively enabled or disabled at different times to effectuate the desired re-routing of input and/or output signals. Various schemes are known in the art of FPGA's and the like for efficiently routing signals along global long lines and/or shorter transmission lines of a given chip and of forming signal routing trees for powering signals onto lines with large or small capacitances as may be appropriate. These various schemes may be employed in the practice of the present invention as appropriate. Those skilled in the art also will understand from the above that the output from MUX 332 can skip BLOCK #3a and go directly to output line 318 instead, thereby skipping or bypassing one or more np-Logic Blocks of the ASIC portion 310 as may be appropriate for fixing a given, uncovered bug or improving on operations of the hybrid-ASIC.

FIG. 4 is a flow chart illustrating a method 400 for using hybrid ASICs in accordance with the invention. At step 410, an ASIC design is tested and refined as many times and to whatever extent deemed appropriate prior to final tapeout. Various market factors may determine how much time is available for thoroughly perfecting the ASIC portion of the design and verifying its correctness. One advantage of the present invention is that a tradeoff can be made between the amount of pro-Logic circuitry to be added to the mostly-ASIC, hybrid device in step 420 and the amount of time expended in step 410. In terms of better context, it is often the case that, prior to step 410, the company's marketing group gives the ASIC designers a marketing wish-list 405 of what is to be included in the new ASIC design. The marketing group also usually gives the ASIC designers a time deadline by which the final prototypes have to be ready for sampling and mass production (e.g., before an upcoming holiday or sales season).

In view of the above, at the intersection of steps 410 and 420, the ASIC designers can start making tradeoffs between the amount of further time and resources they will expend in step 410 to perfect the current version of the ASIC design and the extra costs and risks that may be associated with relying on a pro-Logic fix after mass production commences (step 430). In step 420, the ASIC designers empirically determine the amount pro-Logic circuitry that is to be added to their mostly-ASIC design. The factors that go into this determination may include, but are not limited to: (a) the extent to which the ASIC design has been perfected in step 410, (b) the likelihood that there will be post-tapeout design bugs and the likelihood that such bugs will be fixable with a relatively small amount of pro-Logic circuitry as opposed to a substantially larger amount of pro-Logic circuitry; (c) the number of expected bugs and their types; (d) the maturity or the suitability of the pro-Logic circuit library cells employed; and (e) the experience level of the design team.

Item 425 represents the resultant tapeout file which includes manufacture-ready definitions of the ASIC portions of the design that were finalized in step 410 and manufacture-ready definitions of the pro-Logic circuitry portions of the design that were finalized in step 420. Due to time pressure, it may already contain known errors that have intentionally not been fixed by manufacturing a second or later silicon (second, etc. wafer prototypes) but will instead be corrected in step 460 by programming the pro-Logic circuitry of the hybrid ASIC. In other words, time consuming carrying out of steps 118-119 (FIG. 1) may be bypassed and the first prototype design may be made the final mass-produced version if known bugs can be repaired or bypassed by using the pro-Logic section. Thus even with known bugs, the design company can be first to market.

In step 430, the resultant tapeout file 425 is used for mass producing the hybrid ASIC, whose wafers are represented by icon 435. There are some important advantages to getting to the mass production stage 430 as soon as possible. First, current market demand may support a higher selling price for the pro-Logic repaired functionalities when competition has not yet shown up in the market with the same or alternatively competing functionalities. Market conditions change very rapidly. So any method by which the ASIC designers can shave down the time it takes them to come up with a market-ready ASIC device, gives them a competitive edge. The hybrid ASIC approach described herein is such a method. Second, if a particular market segment is hot at the moment, many competing ASIC design houses may be planning to use a same fabrication foundry for their respective mass productions. The design house that gets there first and establishes a volume customer relationship with the foundry first, before the other houses come in to vie for space on the foundry fabrication line, has the advantage both in negotiating a better price and in being serviced more expeditiously. Box 433 represents that advantage.

Many a competing design house can promise prospective OEM customers that they will be able to deliver in the promised mass production quantities. It is the design house that has already successfully begun mass production (step 430) that has the advantage in winning the design-ins from OEM customers. Box 436 represents that advantage.

By the time of step 440, the design house that used the hybrid ASIC approach is already sampling final prototypes, winning design-ins and beginning to sell inventory in mass quantities. The hybrid ASIC approach is an additional selling point. OEM customers can be made to feel more confident that they will not be caught with a disastrous surprise, such as bug discoveries 137 or 157 of FIG. 1, because the design house using the hybrid ASIC approach already has a built in safety net in their device, namely, the pro-Logic circuitry that will be used to fix any last minute surprises.

At step 450, the quickly-designed and the hybrid ASICs (blank pro-Logic) enter the targeted market spaces very quickly thanks to the advantages gleamed from steps 410-440. If there are bugs in the ASIC design, reports about these will be collected more quickly because there is a larger OEM customer base (won in steps 436 and 440) testing the hybrid ASIC design and possibly even an end-user customer base giving the hybrid ASIC design some in-field testing. Post-production bugs such as 137 and 157 of FIG. 1 will be uncovered more quickly. Once fixes for the reported and collected bugs are developed, these are added to a repairs database 455.

When it is determined that enough first round testing has been conducted by the current OEM customers (and possibly even some beta-testing, end-use customers), the method 400 proceeds to step 460, where the fixes in the repairs database 455 are programmed into the on-chip pro-Logic sections of shipped and/or about-to-be shipped hybrid ASICs. The specific method of programming may vary depending on how the pro-Logic section is structured as having programmable or reprogrammable configuration memory or various hybrids of both. (It is possible to have pluralities of once-burnt fuses coupled to parity detectors—a tree of XOR gates—so that an even number of burnt fuses toggles the output of a given parity detector one way and an odd number the other way.) In some cases, a package-external boot-up ROM or FLASH EEPROM (e.g., 260 of FIG. 2) is initially loaded with the accumulated bug-fixing software (e.g., 275) and then during boot-up of the hybrid ASIC (e.g., 205) or afterwards, parts or all of the bug-fixing software is loaded into the on-chip configuration memory for defining how the pro-Logic section (e.g., 250) will next function. In other cases, parts or all of the bug-fixing software (as well as scheduling software 256 if any) may be directly loaded into the on-chip configuration memory (e.g., 251, 254, 256) for defining how the pro-Logic section (e.g., 250) will next function.

Referring to step 470, after the bug-fixing software has been down-loaded for use with the mass produced, hybrid ASIC; the OEM customers who have already designed that part (435) into their products will be able to get their products to market much quicker. This will enable them to satisfy rush orders of vendors (e.g., retail distributors) who are try to meet the demands of opportunistically emerging markets. Because the OEM customers will be satisfied with the quick turn-around for creating the bug-free hybrid ASICs (bug free to the extent known thus far) and the end-use customers will be happy with the rapid response to their demands, the ASIC design house will be better able to opportunistically enter emerging markets as situations evolve. The mass market retailer of the programmed hybrid ASICs will be able to opportunistically establish good business relationships with end-users of the hybrid ASIC chips. The mass production and mass distribution companies involved will therefore be able to opportunistically establish goodwill and to receive helpful feedback from the quickly-serviced customers and to relay this back to the design house that developed the hybrid ASIC (435).

A number of benefits will flow from this. As a result of the good relationships established in step 470, customers will be more willing to report even newer bugs (if any) uncovered after the product(s) enter the field. The feedback information 476 will be used to further improve the repairs database 455 and to produce a second generation of bug-fixing software, which at step 460 will be downloaded into in-field or in-warehouse systems as appropriate. (The invention contemplates in-situ, in-system programming of the pro-Logic configuration memory so that systems can be made more bug-free even if the end-use customers and/or OEM customers are unaware of the improvement at the time.) Customers can be told that their installed, hybrid ASICs will be self-improving (in a sense) even as they sit in the warehouse or already installed in a remote field installation. A bug-removal network effect therefore develops because more customers will be willing to purchase and use the hybrid ASIC; the enlarged customer base will better test the hybrid ASIC and locate bugs not uncovered before; the new bugs will be more quickly reported to the ASIC design house and corresponding fixes will be more quickly incorporated into the repairs database 455 so that they can be downloaded into the hybrid ASICs utilized by the growing customer base.

Another benefit of customer satisfaction is that at step 480, the marketing departments of the OEM mass producer and of the ASIC design house, based on bugs discovered, will be able to opportunistically collect feedback reports from the customers that have used designed the programmed hybrid ASIC in their end products in various market spaces. This quickly-acquired feedback information 480 may give the marketing department(s) new insights as to what features are more frequently used (because bug reports tend to increase for more frequently used features of an ASIC-based design, while bugs of less or unused features are not found or reported), and what additional features or feature mixes will next be desired by the various customer bases in next-generation of hybrid ASIC-based products. In step 490 the marketing departments use the feedback obtained from step 480 to predict and rank the new features that probably will be desired by various markets for the next-generation designs of the end-product and/or of the hybrid ASIC (435) that is to be used in the next-generation end-products. Path 494 represents the creation of a new wish list 495 similar to, but richer than, the original list 405 and directed to the next-generation core design for the hybrid ASIC. Step 496 returns the process to step 410 where the engineering group in the design house receives the new wish list 495 and begins to design the next generation hybrid ASIC (435) with its included pro-Logic sections.

It may be seen from the overall flow of FIG. 4 that the use of a hybrid ASIC chip (e.g., 205 of FIG. 2) helps to establish good customer relationships and creates new opportunities and faster response times for real-time changes in various market spaces. The time-to-market and time-to-start of the next-generation products is faster than what could be provided had the ASIC design house instead used a conventional ASIC design that did not have the pro-Logic section (e.g., 250) incorporated into it for making post mass production fixes as may be required in a specific one or more market spaces (not every market space necessarily gets the same batch of big fixes). The slightly more bulky and more expensive hybrid ASIC chip (205—more bulky because it includes the pro-Logic section 250) actually makes its mass producer and OEM users more nimble and more able to quickly enter new and emerging markets as opportunities appear because they have a safety net for repairing bugs (137, 157) uncovered after mass production has begun. It allows the mass producers to establish stronger business relationships (steps 436, 470) with existing or potential customers and to get more and quicker feedback (steps 476 and 480). It allows even a fledgling design house to establish relationships with fabrication foundries as a volume customer (step 433) rather than as a specialty-run customer (a customer that requires only a small volume of produced wafers). It allows everyone involved to better hedge their bets so that they will be less prone to being stuck with a large inventory 435 of dice that have one or more, fault-infected ASIC blocks and are therefore unsellable in a fickle and fast-changing market place.

For those skilled in the art, it will be apparent from the above that, when the system employing this hybrid ASIC has patch inloading capabilities, and an np-Logic part of the hybrid ASIC is damaged (i.e. by hard radiation or heat) or otherwise fails, then the hybrid ASIC can be repaired in situ, and even remotely by use of the inloading capabilities in combination with an appropriate communications network (e.g., wireless or wired). This in-situ repair capability can be extremely valuable or critical to mission success if the system is in a remote, non-accessible or hostile environment for example in satellite, under ground or near submerged cables, etc. Then the faulty part of the circuit can be repaired remotely in situ by sending repair data to the system for causing the pro-Logic section to intervene and take corrective action. The pro-Logic section may be used for fault isolation by setting breakpoints at which operations of suspect parts of the np-Logic section will be temporarily halted to remotely sense their states at that time and to thereby determine where the fault may lie.

FIG. 5 is illustrative of one of the approaches 500 that may be used to coordinate a bug fix within a system that has one or more hybrid ASICs installed in it. At step 510, the hybrid ASIC chip(s) is/are powered up and initialized during system start up together with other in-system devices. At step 512, for each of the installed hybrid ASICs, it is determined whether there are any external pro-Logic algorithms to be inloaded into the respective hybrid ASICs during system boot-up or power-up, and if yes, the correspondingly identified algorithms are loaded into the respective hybrid ASIC chip(s). The inloaded algorithms may include any one or more of detection algorithms, intervention actualization algorithms, intervention-coordination algorithms and scheduling algorithms.

At step 520, one of the pro-Logic detection algorithms recognizes an ASIC operational state associated with a known ASIC fault. The fault can be immediate or one that will be occurring in a predetermined or determinable number of machine cycles. At step 522, the pro-Logic section waits for the non-programmable ASIC section in the chip to reach a state where it will be safe to put one or more of the on-chip ASIC blocks to sleep (a sleep-ready state), to standby, or have its output disabled or bypassed. At step 525, the pro-Logic section puts the affected portions of the ASIC section to sleep, standby, or bypassed. In some cases, the pro-Logic section may intervene on a system wide basis and put system circuitry outside of the fault-infected, or entire np-Logic of the hybrid ASIC to sleep, standby or bypassed to allow additional external bug-fixing operation.

At step 530, one or more of the pro-Logic sections will select and activate the appropriate intervention algorithm(s). Selection may occur prior to the initiation of sleep sate 525. This is just an example. The activated intervention algorithm (s) perform corresponding bug-fixing operations.

At step 532, the corresponding pro-Logic section(s) waits for one or more of the intervention algorithms to signal their completion. At step 535, the affected ASIC portions are brought out of the sleep state. Intervention may have included switching the asleep ASIC portions to machine states other than the ones they were in when they were put to sleep. The awakened ASIC portions may then continue to operate without being aware they had been put to sleep and that the bug had been corrected by the intervention algorithm(s) executed by the pro-Logic section. It is possible that the affected np-Logic ASIC portion may stay in the sleep state for several machine cycles and then be brought out of the sleep state. That is, step 535 may be skipped over for a predefined number of times until the fault-infection of the affected np-Logic circuit is deemed "bug free."

At step 540, the pro-Logic section determines if any further external, pro-Logic algorithms need to be inloaded to supplement or replace the current pro-Logic software for servicing the ASIC portion of the hybrid ASIC chip as that ASIC portion advances to its next mode. If yes, the new algorithms are inloaded at opportunistically appropriate times. Step 540 may occur before step 535. Control then passes via path 550 back to step 520, where the current detection algorithms are running and waiting to recognize the next known fault state, if any.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Among the variations contemplated by the present invention, the pro-Logic portion (250) may include decryption circuitry (not shown) for receiving an encrypted key signal, where proper decryption of the encrypted key signal by the decryption circuitry is required to enable programming or reprogramming of the pro-Logic portion with initial or additional or replacement configuration data. The pro-Logic portion (250) may be operatively coupled to a wireless receiver (either within the hybrid ASIC or externally thereof) for receiving configuration data that is wirelessly transmitted from external programming equipment for defining operations of the pro-Logic portion. The pro-Logic portion (250) may control power-providing switches which provide power selectively to a corresponding one or more of the ASIC blocks and/or the pro-Logic portion (250) may control exterior coupling switches which provide coupling selectively between a corresponding plurality of to-exterior linking nodes or pins of the hybrid ASIC and a corresponding one or more of the ASIC blocks inside the hybrid ASIC.

Further among the variations contemplated by the present invention, ASIC-type or ASSP-type analog functionality can be supplemented with programmable-type analog functionality so that Spartan repair for fixed analog circuitry can be provided in the similar ways to the above described, programmable repair for digital logic. Detection of a fault condition can be analog-based and/or digital-based and the switched substitution in of correction circuitry or bypass circuitry can similarly be analog-based and/or digital-based.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

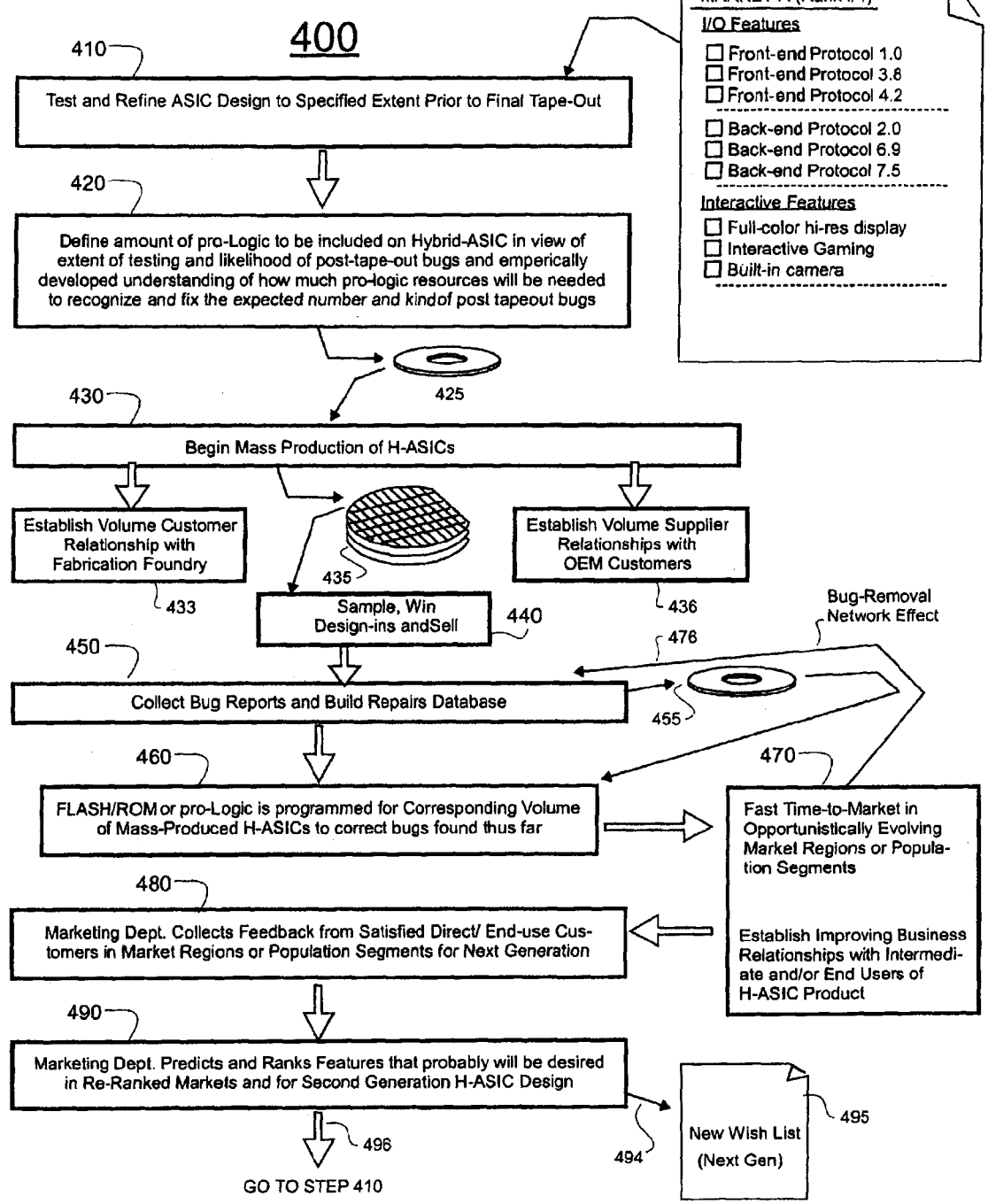

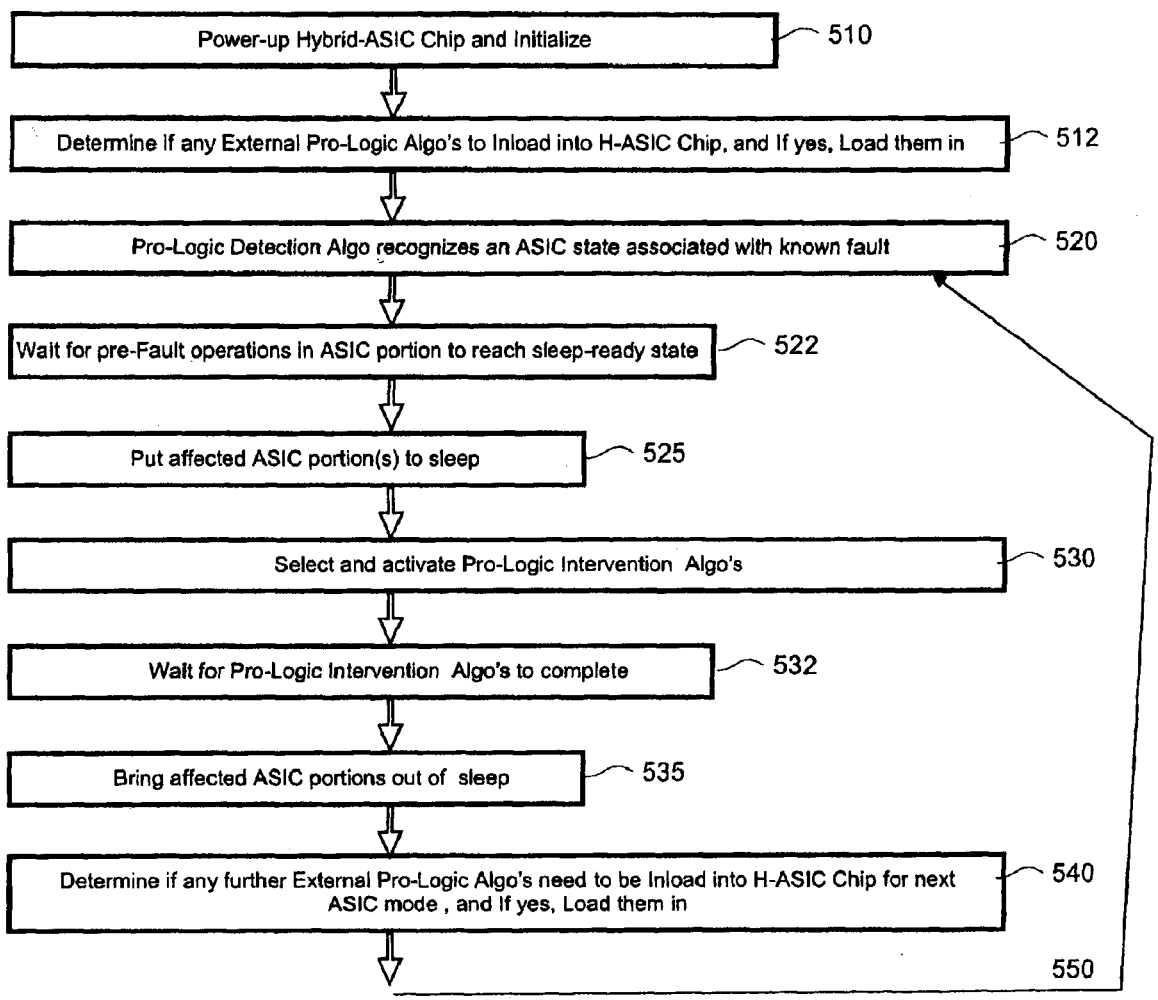

What is claimed is:

1. An apparatus comprising:
   a non-programmable circuit; and
   a programmable circuit coupled to the non-programmable circuit, wherein the programmable circuit is configured, during operation of the non-programmable circuit, to:
   detect a state associated with a fault of the non-programmable circuit; and
   based, at least in part, on the detected state, alter an operation of at least a portion of the non-programmable circuit and perform a corrective action.

2. The apparatus of claim 1, wherein the programmable circuit is further configured to perform the corrective action by asserting control over a bus.

3. The apparatus of claim 2, wherein the programmable circuit is further configured to insert a replacement signal into the bus in connection with the corrective action.

4. The apparatus of claim 1, wherein the programmable circuit is further configured to alter the operation of the non-programmable circuit by deactivating the at least a portion of the non-programmable circuit.

5. The apparatus of claim 4, wherein the programmable circuit is further configured to reactivate the at least a portion of the non-programmable circuit after having performed the corrective action.

6. The apparatus of claim 1, wherein the programmable circuit is further configured to transmit a report including the fault to a remote location via a communications network.

7. The apparatus of claim 1, wherein the programmable circuit is further configured to receive at least one instruction that, upon execution, reconfigures the programmable circuit to perform a different corrective action in response to a subsequent detection of the state.

8. The apparatus of claim 7, wherein the programmable circuit is further configured to receive an encrypted key signal that enables its reconfiguration.

9. The apparatus of claim 1, wherein the programmable circuit is configured to detect the state associated with the fault of the non-programmable circuit before the fault occurs.

10. A method comprising:
    during operation of a non-programmable circuit:
    detecting, by a programmable circuit coupled to the non-programmable circuit, a state associated with a fault of the non-programmable circuit;
    altering an operation of at least a portion of the non-programmable circuit based, at least in part, on the detected state; and
    performing a corrective action based, at least in part, on the detected state.

11. The method of claim 10, wherein said performing a corrective action further comprises asserting control over a bus.

12. The method of claim 11, further comprising inserting a replacement signal into the bus in connection with the corrective action.

13. The method of claim 10, wherein said altering an operation comprises deactivating the at least a portion of the non-programmable circuit.

14. The method of claim 13, further comprising reactivating the at least a portion of the non-programmable circuit after said performing a corrective action.

15. The method of claim 10, further comprising transmitting a report including the fault to a remote location via a communications network.

16. The method of claim 10, further comprising receiving at least one instruction that, upon execution, reconfigures the programmable circuit to perform a different corrective action in response to a subsequent detection of the fault condition.

17. The method of claim 16, further comprising receiving an encrypted key signal that enables reconfiguration of the programmable circuit.

18. The method of claim 10, further comprising:
    transmitting, to a particular location remote from the programmable circuit and the non-programmable circuit, information indicating that the corrective action has been performed; and
    reconfiguring, based at least in part on information received from the particular location, the programmable circuit to perform a different corrective action in response to a subsequent detection of the state associated with the fault of the non-programmable circuit.

19. The method of claim 18, further comprising receiving an encrypted key signal that enables said reconfiguring the programmable circuit.

20. The method of claim 10, wherein said detecting a state associated with a fault of the non-programmable circuit occurs before the fault of the non-programmable circuit occurs.

21. A method comprising:
programming a programmable circuit coupled to a non-programmable circuit within an integrated circuit, wherein the programmed circuit is configured, during operation of the non-programmable circuit, to:
detect a state associated with a fault of the non-programmable circuit; and
based, at least in part, on the detected state, alter an operation of at least a portion of the non-programmable circuit and perform a corrective action.

22. The method of claim 21, wherein the programmed circuit is further configured to perform the corrective action by asserting control over a bus.

23. The method of claim 22, wherein the programmed circuit is further configured to insert a replacement signal into the bus in connection with the corrective action.

24. The method of claim 21, wherein the programmed circuit is further configured to alter the operation of the non-programmable circuit by deactivating the at least a portion of the non-programmable circuit.

25. The method of claim 24, wherein the programmed circuit is further configured to reactivate the at least a portion of the non-programmable circuit after having performed the corrective action.

26. The method of claim 21, wherein the programmed circuit is further configured to transmit a report including the fault to a remote location via a communications network.

27. The method of claim 21, wherein the programmed circuit is further configured to receive at least one instruction that, upon execution, reconfigures the programmed circuit to perform a different corrective action in response to a subsequent detection of the state.

28. The method of claim 27, wherein the programmed circuit is further configured to receive an encrypted key signal that enables its reconfiguration.

29. The method of claim 21, wherein the programmable circuit is configured to detect the state associated with the fault of the non-programmable circuit before the fault occurs.

* * * * *

UNITED STATES PATENT AND TRADEMARK OFFICE
CERTIFICATE OF CORRECTION

| | | |
|---|---|---|
| PATENT NO. | : 8,341,581 B2 | Page 1 of 3 |
| APPLICATION NO. | : 12/145275 | |
| DATED | : December 25, 2012 | |
| INVENTOR(S) | : Koo | |

It is certified that error appears in the above-identified patent and that said Letters Patent is hereby corrected as shown below:

On the Title Page, in Item (57), under "ABSTRACT", in Column 2, Line 7, delete "operation):" and insert -- operation). --, therefor.

In the Drawings:

Delete drawing sheets 4 and 5 and substitute the attached drawing sheets containing figures 4 and 5 therefor.

In the Specifications:

In Column 6, Line 54, delete "anew" and insert -- a new --, therefor.

In Column 14, Line 35, delete "410," and insert -- 410; --, therefor.

In Column 15, lines 36-37, delete "un covered" and insert -- uncovered --, therefor.

Signed and Sealed this
Ninth Day of July, 2013

Teresa Stanek Rea
*Acting Director of the United States Patent and Trademark Office*